(12) United States Patent
Pennings

(10) Patent No.: US 12,360,236 B2
(45) Date of Patent: Jul. 15, 2025

(54) HIVE-CELL ORGANIZATION AND PROCESSING OF RADAR DATA

(71) Applicant: R2 Space, LLC, Ann Arbor, MI (US)

(72) Inventor: Jeffrey Scott Pennings, Ann Arbor, MI (US)

(73) Assignee: R2 SPACE, LLC, Ann Arbor, MI (US)

( * ) Notice: Subject to any disclaimer, the term of this patent is extended or adjusted under 35 U.S.C. 154(b) by 576 days.

(21) Appl. No.: 17/695,141

(22) Filed: Mar. 15, 2022

(65) Prior Publication Data

US 2022/0308201 A1 Sep. 29, 2022

Related U.S. Application Data

(60) Provisional application No. 63/165,607, filed on Mar. 24, 2021.

(51) Int. Cl.
*G01S 13/90* (2006.01)
*G06T 1/20* (2006.01)

(52) U.S. Cl.
CPC ............ *G01S 13/9021* (2019.05); *G06T 1/20* (2013.01)

(58) Field of Classification Search
CPC .............................. G01S 13/9021; G06T 1/20
See application file for complete search history.

(56) References Cited

FOREIGN PATENT DOCUMENTS

JP          2006266735 A   * 10/2006
WO     WO 2016099184 A1   *  6/2016

OTHER PUBLICATIONS

M.K. Shepard et al., "A revised shape model of asteroid (216) Kleopatra" Icarus 311 (2018) 197-209 (Year: 2018).*
Pedzich, "Image of the World on polyhedral maps and globes", Polish Cartographical Review vol. 48, 2016, No. 4, pp. 197-210 DOI: 10.1515/pcr-2016-0014 (Year: 2016).*

* cited by examiner

*Primary Examiner* — Timothy A Brainard
*Assistant Examiner* — Helena H Seraydaryan

(57) ABSTRACT

Various embodiments of the present technology relate to system, methods, and devices for capturing, processing, and rendering synthetic aperture radar data captured by a radar-based imaging system on graphical processing units based on a hive-cell mapping using a tessellation of a Goldberg polyhedron. In some embodiments, SAR data is produced by a radar-based imaging system. A computing apparatus receives the SAR data and associates at least a portion of the SAR data to one or more cells of a Goldberg polyhedron that covers the globe in approximately equally sized hexagonal or pentagonal cells based at least on a location of the SAR data. The computing apparatus provides the portion of the SAR data associated with one or more cells of the Goldberg polyhedron to one or more GPUs, and then processes the SAR data on each of the one or more GPUs to construct images from the SAR data.

20 Claims, 8 Drawing Sheets

HIVE-CELL ORGANIZATION AND PROCESSING OF RADAR DATA

RELATED APPLICATIONS

This application hereby claims the benefit and priority to U.S. Provisional Application No. 63/165,607, titled "HIVE-CELL ORGANIZATION AND PROCESSING OF RADAR DATA," filed Mar. 24, 2021, which is hereby incorporated by reference in its entirety.

TECHNICAL FIELD

Various embodiments of the present technology generally relate to processing synthetic aperture radar data captured by a radar-based imaging system on graphical processing units. More specifically, some embodiments relate to system, methods, and devices for hive-cell mapping of synthetic aperture radar data and GPU-based processing of the radar data based on the hive-cell mapping.

BACKGROUND

In a world with continuous growth and change in landscapes and increased urbanization, maps fail to capture the transformation of topologies in a timely manner. Cities continue to expand, and buildings and other objects move from location to location. While satellite imaging can slowly capture the ever-changing topography, climate, restricted airspace, and time of day affects the ability to capture data to piece together changes fast enough.

Recently, high resolution synthetic aperture radar (SAR) technology has found success in capturing similar data regardless of weather events and the time of day. Though SAR-equipped satellites, for example, still struggle to compile data in single passes, meaning the accumulation of a significant amount of data consumes much time. Once SAR data is collected, processing the data has proven to be complicated and time-consuming as well. With an abundance of collected data, processing SAR data consists of complex transformations to render images viewable by computing devices and applications. Additionally, typical CPU architectures fail to support real-time processing given their lack of computing cores to support such complex processing.

As the world continues to develop, a long-felt need for efficient processing of vast amounts of radar data in real-time persists. The present disclosure covers embodiments relevant to collecting, organizing, processing, and rendering SAR data using GPU-based processing.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer readable media for processing synthetic aperture radar data captured by a radar-based imaging system on graphical processing units. In some embodiments, a computing apparatus comprises one or more computer-readable storage media, a processing system operatively coupled with the one or more computer-readable storage media, and program instructions stored on the one or more computer-readable storage media that, based on being read and executed by the processing system, direct the computing apparatus to perform functions. Such functions comprise receiving synthetic aperture radar (SAR) data produced by a radar-based imaging system, associating at least a portion of the SAR data to one or more cells of a Goldberg polyhedron, providing the portion of the SAR data associated with the one or more cells of the Goldberg polyhedron to one or more graphics processing units (GPUs), and processing the SAR data on each of the one or more GPUs.

In such embodiments, the radar-based imaging system may comprise one or more satellites equipped with SAR technology to perform the functions. Upon capturing SAR data, the computing apparatus may associate portions of the SAR data to the Goldberg polyhedron based on coordinates associated with the portion of the SAR data and coordinates assigned to the cells of the polyhedron. Then, based on properties of the GPUs, such as processing capacity of the GPU or a resolution or density of the SAR data, for example, the program instructions may direct the computing apparatus to select one or more GPUs to process the respective data. Ultimately, the SAR data is processed into two-dimensional and/or three-dimensional images.

Another embodiment relates to a method of processing radar-based data, such as SAR data. First, the method comprises receiving SAR data produced by a radar-based imaging system. The system described can include one or more satellites or some other land-, sea-, and air-based radar technology. Next, the method comprises associating at least a portion of the SAR data to one or more cells of a Goldberg polyhedron. The Goldberg polyhedron is mapped to the Earth, covering each part of the earth in equally sized hexagons and pentagons each having coordinates assigned to them. Based on the location, and consequently a coordinate mapping, of the SAR data, the portion of the SAR data can be associated with one or more cells of the Goldberg polyhedron. The method then discloses providing the portion of the SAR data associated with one or more cells of the Goldberg polyhedron to one or more GPUs. Such association between SAR data and GPUs may be based on properties of the GPUs such as memory, or it may be based on properties of the SAR data such as resolution or size of the data. Lastly, the method comprises processing the SAR data on each of the one or more GPUs, thus, creating 2D or 3D images from the SAR data.

Further embodiments relate to another method of processing radar-based data in the instance of a smaller data set. First, the method comprises receiving SAR data produced by a radar-based imaging system. Next, it comprises associating at least a portion of the SAR data to one cell of a Goldberg polyhedron. Then, it comprises providing the portion of the SAR data associated with one cell of the Goldberg polyhedron to one GPU and processing the portion of the SAR data associated with a respective cell on a respective GPU. As such, one cell of the Goldberg polyhedron is assigned one GPU for processing purposes. In some embodiments, the single GPU may also be referred to as a thread on the GPU.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

Figure 1:
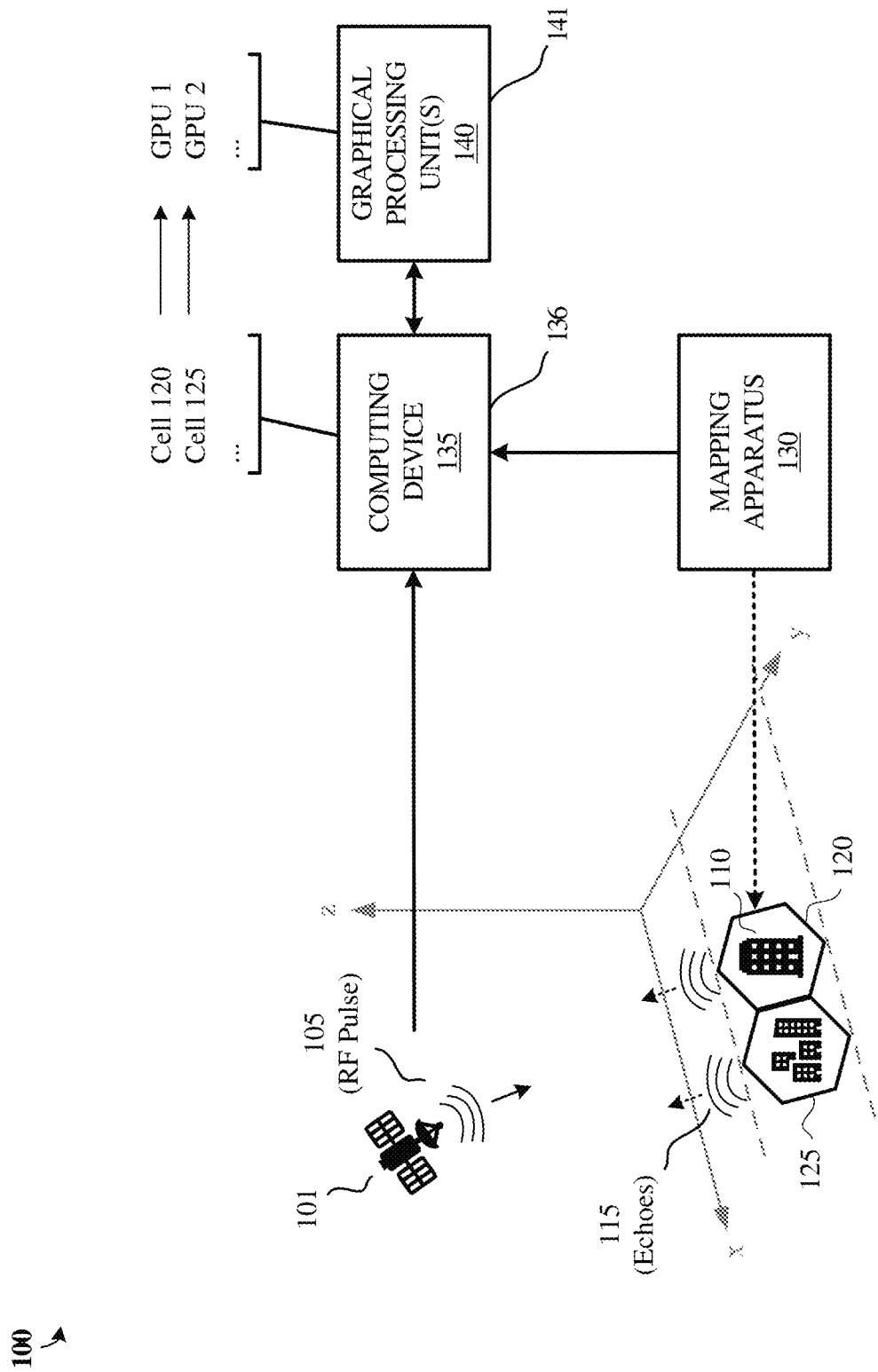
FIG. 1 illustrates an exemplary operating environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to systems, methods, and computer-readable media for capturing, processing, and rendering synthetic aperture radar data captured by a radar-based imaging system on graphical processing units based on a hive-cell mapping using a Goldberg polyhedron. Synthetic aperture radar (SAR) technology is used to capture large areas on Earth from far distances, such as from a satellite in space. Using SAR equipment, equipped to a satellite for example, allows for efficient and cheap capturing of an area over a single pass of the satellite. A further pass over the area can help identify changes in the landscape or scenery providing insight on change detection or other measures. The use of SAR to capture images in highly restrictive or difficult to access areas is well-known, however, the ability to process SAR data quickly and efficiently provides a new advantage.

A hive-cell mapping of Earth using a tessellation of an icosahedron, such as a Goldberg polyhedron, provides for uniformity in organizing radar data based on its capture location. A Goldberg polyhedron provides surface coverage of a spherical object using shapes of the same sizes to ensure an even distribution of the shapes. In some scenarios, shapes like hexagons and pentagons make up the spherical mapping. In other cases, shapes like triangles can be used to create an even distribution among the spherical surface area. Depending on the number of cells (i.e., hexagons and pentagons) used to create the Goldberg polyhedron, one cell can account for several areas on Earth, or it can represent a local place at a more granular level. The ability to divide the Earth into cells using a Goldberg polyhedron provides an advantage in the radar data space because it evenly distributes data based on a specific, known location. Additionally, this data distribution model ensures that future collections of data captured from the same area can be combined coherently, for interferometry for example, without requiring specialized pre-processing. The level of tessellation, or put another way, the number of cells covering Earth, depends on various factors such as the quality, density, or size of the SAR data captured. In order to ensure maximum processing efficiency, the level of tessellation may be increased or decreased as needed.

Once SAR data is captured, the data can be mapped to one or more specific cells based on its location. SAR data confined to a cell can then be assigned to a GPU for processing of the radar data. With more radar data and, thus, more respective cells, further processing jobs can be assigned to further GPUs, if available. If the GPU has a full job load or insufficient processing capacity, the additional cells can be assigned to new GPUs. Thus, using GPU-based processing at the individual level allows for streamlined processing to handle the jobs in a uniform and organized process.

Some embodiments of the present technology provide a method of processing the radar-based data. The method begins with receiving SAR data produced by a radar-based imaging system. The radar-based imaging system comprises SAR technology used to capture high-resolution radar data from long-distances. Next, the method comprises associating at least a portion of the SAR data to one or more cells of a Goldberg polyhedron and providing the portion of the SAR data associated with the one or more cells of the Goldberg polyhedron to one or more graphics processing units (GPUs). By organizing the data into confined, even distributed cells, the GPUs or threads on the GPUs can process the SAR data in an efficient manner. Lastly, the method comprises processing the SAR data on each of the one or more GPUs. Each of the GPUs used in the processing step aligns SAR data with both the Goldberg polyhedron and a digital elevation map to reconstruct the data onto a topographical hive-cell mapping. In this final step, the SAR data can be transformed into two-dimensional and three-dimensional mappings for use in computer-aided design models and various file formats, for example.

Other embodiments provide a computing apparatus to process SAR data using GPUs. The computing apparatus comprises one or more computer-readable storage media, a processing system operatively coupled with the one or more computer-readable storage media, and program instructions stored on the one or more computer-readable storage media that, based on being read and executed by the processing system, direct the computing apparatus to perform several functions. Functions include receiving SAR data produced by a radar-based imaging system. The computing apparatus may communicate with the radar-based imaging system over a virtual private network, secure file transfer protocols, application programming interfaces, or other communication links. Other functions include associating at least a portion of the SAR data to one or more cells of a Goldberg polyhedron and providing the portion of the SAR data associated with the one or more cells of the Goldberg polyhedron to one or more GPUs. The computing apparatus may provide the portion of SAR data to single GPUs, to single threads on a GPU, or to multiple GPUs. The GPUs then process the SAR data to form images of the targeted area captured by the radar-based imaging system.

Now referring to the Figures, FIG. 1 illustrates an exemplary operating environment 100 in which some embodiments of the present technology may be utilized. FIG. 1 demonstrates a satellite, equipped with synthetic aperture radar (SAR) technology, transmitting a radiofrequency (RF) pulse to a target on Earth in order to capture radar data from a targeted area. FIG. 1 includes operating environment 100 which contains satellite 101, RF pulse 105, imaging target 110, echoes 115, target cell 120, adjacent cell 125, mapping apparatus 130, computing device 135, and graphical processing units (GPUs) 140. Computing device 135 further includes data properties 136, and GPU 140 further includes GPU properties 141.

In accordance with some embodiments, satellite 101 comprises SAR equipment used to capture complex radar data from long distances. During flight, satellite 101 emits one or more RF pulse 105 towards imaging target 110. As depicted, imaging target 110 includes a building; however, imaging target may be any landscape, structure, and the like, on Earth. Satellite 101 may emit RF pulse 105 one time, or it may emit continuous pulses during its orbit depending on a location and size of the targeted zone. When RF pulse 105 reaches imaging target 110, echoes 115 rebound off the structures and reflect in various directions towards satellite 101. Satellite 101 then captures the echoes 115 to receive SAR data. In some embodiments, satellite 101 may transmit the captured SAR data directly to computing device 135, or alternatively, it may downlink the data to a receiver or station somewhere on Earth, which then transmits the data to computing device 135 via some communication link.

In various embodiments, computing device 135 comprises a mapping apparatus used to create a tessellation of an icosahedron or a Goldberg polyhedron-type mapping of Earth. The tessellation of the Goldberg polyhedron includes equally sized hexagonal and pentagonal cells covering the globe. In other embodiments, such as illustrated in FIG. 1, mapping apparatus 130, independently from computing device 135, creates the tessellation of a Goldberg polyhedron mapping and communicates the mapping to computing device 135. The mapping comprises data including the boundaries of each cell, coordinates of areas located within each cell, such as latitude and longitude, and the like. The level of tessellation provided by mapping apparatus 130 depends on various factors, such as a size of imaging target 110, a desired image quality of the SAR data, a processing capacity of GPUs 140, or some combination of the aforementioned factors. Additionally, the shape of the cells of the tessellated icosahedron may vary based on the aforementioned factors or other circumstances.

Simultaneously or subsequently, computing device 135 determines a location or coordinates of the captured SAR data to align the data with the mapping provided by mapping apparatus 130. As an example, target cell 120 contains imaging target 110, while adjacent cell 125 contains a group of buildings that may also be captured in the SAR data by satellite 101. The SAR data that includes imaging target 110 comprises coordinates and various information in its metadata that allows computing device 135 to determine the precise cell, target cell 120 as illustrated in FIG. 1, in which the portion of data is contained. Computing device 135 can then associate the cell and portion of SAR data together. In various instances, the correlation of SAR data to one or more cells occurs at the metadata level.

Next, to process and render images from the SAR data, computing device 135 provides the SAR data to GPUs 140 to form two-dimensional and/or three-dimensional images. In various embodiments, computing device 135 organizes the SAR data by cell and assigns individual cells to individual GPUs 140. For example, computing device 135 provides the portion of the SAR data captured in target cell 120 to one of GPUs 140, and it provides the SAR data associated with adjacent cell 125 to a different one of GPUs 140 for processing. In other embodiments, computing device 135 may assign more than one cell to an individual GPU, or it may assign one cell to multiple GPUs of GPUs 140. Computing device 135 can select a particular GPU of GPUs 140 for a processing job based on data properties 136 and/or GPU properties 141 to ensure maximum processing efficiency of the SAR data. With respect to the SAR data, computing device 135 determines and stores data properties 136, which comprises information about the SAR data such as resolution, density, size, and the like. With respect to GPU 140, computing device 135 determines GPU properties 141 such as memory and size of the GPU, availability or processing capacity of the GPU, number of GPUs available, and more. GPU properties 141 may be determined automatically by computing device 135 or they may be determined by manual input of information in computing device 135.

Still referring to FIG. 1, a specific example as illustrated in the Figure is described. For instance, after capturing imaging target 110, computing device 135 recognizes that target cell 120 contains a high-resolution SAR image that requires full processing capacity by a single GPU of GPUs 140 in order to efficiently process the job. Likewise, adjacent cell 125 also contains high-resolution image data. Rather than processing both cells on one GPU, computing device 135 detects and uses a further GPU of GPUs 140 that has available processing capacity, determined by GPU properties 141. In other instances, target cell 120 and adjacent cell 125 may contain low-resolution image data from a small area on the polyhedron mapping. In such instances, computing device 135 may assign one GPU of GPUs 140 to process both cells, provided that the processing efficiency is maximized. Upon processing the SAR data, GPUs 140 may communicate the rendered product back to computing device 135 or it may communicate the data downstream.

Figure 2:
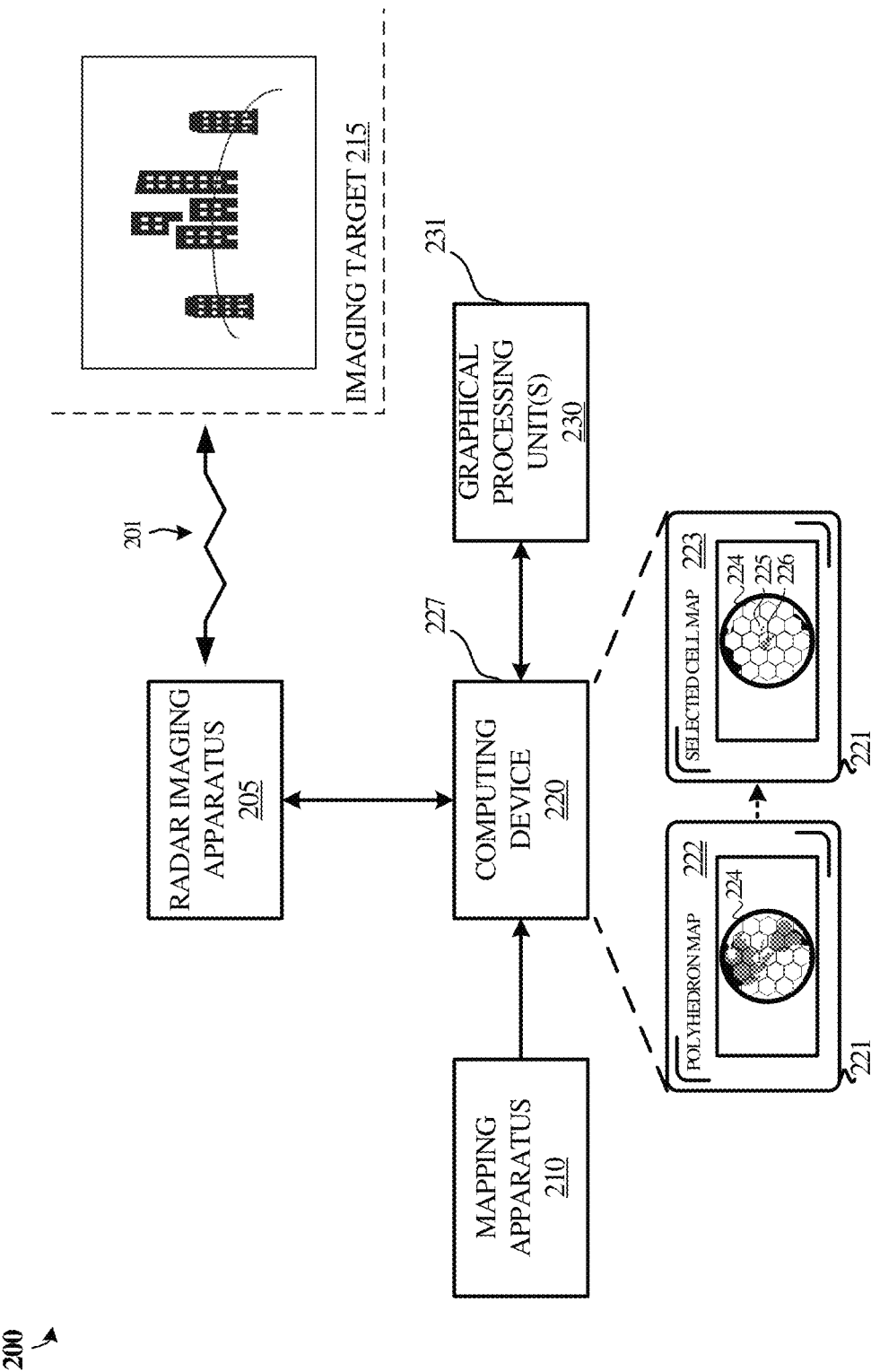
FIG. 2 illustrates an exemplary architectural environment in which some embodiments of the present technology may be utilized.

Moving to FIG. 2, FIG. 2 illustrates an exemplary architectural environment in which some embodiments of the present technology may be utilized. FIG. 2 includes architectural environment 200, which further includes radar imaging apparatus 205, mapping apparatus 210, imaging target 215, computing device 220, and graphical processing units (GPUs) 230. Computing device 220 also includes graphical user interface 221, polyhedron map 222, selected cell map 223, Goldberg polyhedron 224, associated cells 225 and 226, and SAR data properties 227. Graphical processing units 230 further includes GPU properties 231.

In various embodiments, radar imaging apparatus 205 comprises a radar-based device or system, such as one or more satellites, equipped with synthetic aperture radar (SAR) technology. Radar imaging apparatus 205 obtains SAR data from an imaging target 215 by transmitting radio frequency pulses towards a targeted area and receiving echoes from the surface(s) of the objects in the area. As illustrated, imaging target 215 comprises a set of buildings; however, imaging target 215 may include various structures, landscapes, and the like with varying topologies. The RF pulses hit each of the buildings at various points, thus, sending echoes back in different directions towards radar imaging apparatus 205. Once the SAR data is collected, radar imaging apparatus 205 transmits the data to computing device 220. Computing device 220 may communicate with radar imaging apparatus 205 over one or multiple communication links among several types of communication links, wirelessly or via a wired network.

Mapping apparatus 210 serves to provide a tessellation of an icosahedron, such as a Goldberg polyhedron, of Earth to computing device 220. In some instances, computing device 220 comprises a mapping apparatus 210; however, in other instances, mapping apparatus 210 functions on its own or may exist as a third party-run application. The Goldberg polyhedron employed in FIG. 2 represents a hive of hexagonal and pentagonal cells covering the globe. The number of cells included in the polyhedron may vary based on a level of tessellation. Each cell comprises boundaries and coordinates, such as latitude and longitude, of the part of the globe covered by the cell, which may be provided by mapping apparatus 210 or assigned by computing device 220. In other implementations, mapping apparatus 210 may provide a mapping of the globe using triangles or some other shape to accomplish the same purpose of providing cells with associated coordinates for reference. Computing device 220 can display the polyhedron map 222 on a graphical user interface (GUI) 221. On GUI 221, Goldberg polyhedron 224 can be viewed or selected to demonstrate locations and coordinates of the various cells.

Upon receiving the SAR data from radar imaging apparatus 205, computing device 220 can associate the SAR data with cells of the Goldberg polyhedron 224 provided by mapping apparatus 210. In various embodiments, computing device 220 can determine one or more coordinates associated with the SAR data based on the location of imaging target 215. Thus, by comparing the coordinates of the SAR data with the coordinates assigned to each cell of Goldberg polyhedron 224, computing device 220 can correlate the respective metadata together. Accordingly, associated cells 225 and 226, as illustrated on selected cell map 223, demonstrate the location of the captured SAR data with respect to Goldberg polyhedron 224. In other embodiments, computing device 220, or a user, may select only a portion of the SAR data to be displayed on GUI 221 by choosing certain cells of Goldberg polyhedron 224, represented by associated cells 225 and 226. Additionally, either mapping apparatus 210 or computing device 220 can provide a digital elevation model, or a topographical mapping, of Earth. Computing device 220 aligns both Goldberg polyhedron 224 and the digital elevation model at the metadata level before communicating an overlaid mapping of the combination to GPUs 230. This aligned mapping may also be displayed on GUI 221 for further insight into the SAR data.

Like mapping apparatus 210, GPUs 230 may function within computing device 220 or they may exist separately from computing device 220. In various implementations, computing device 220 provides the SAR data captured by radar imaging apparatus 205, or at least a portion of the SAR data, to GPUs 230 to process and render two-dimensional and/or three-dimensional images from the data. Computing device 220 organizes the data that each of GPUs 230 receives according to GPU properties 231 and/or SAR data properties 227. Examples of SAR data properties 227 include radar data magnitude and phase, size, associated polyhedron cells (like associated cells 225 and 226), SAR data density, SAR data resolution (or a desired image resolution), and more. Examples of GPU properties 231 include processing availability or a current job list, memory capacity, size of the GPU, and the like. GPU properties 231 may be provided by GPUs 230 to computing device 220, or they may be input manually by a user and stored in computing device 220. Next, based on one or both sets of properties, computing device 220 selects portions of the SAR data to be processed on individual GPUs 230. In an implementation, one cell of Goldberg polyhedron 224, such as associated cell 225, is mapped to one GPU of GPUs 230, and another cell, like associated cell 226, is mapped to another GPU of GPUs 230. Alternatively, multiple cells of Goldberg polyhedron 224 can be mapped to one of GPUs 230. In such an implementation, each cell or processing job may be mapped to an individual thread on a GPU of GPUs 230. Organization of SAR data to respective GPUs or GPU threads allows for minimization of random-access memory during processing, which maximizes throughput to render images from the SAR data more efficiently.

Figure 3B:
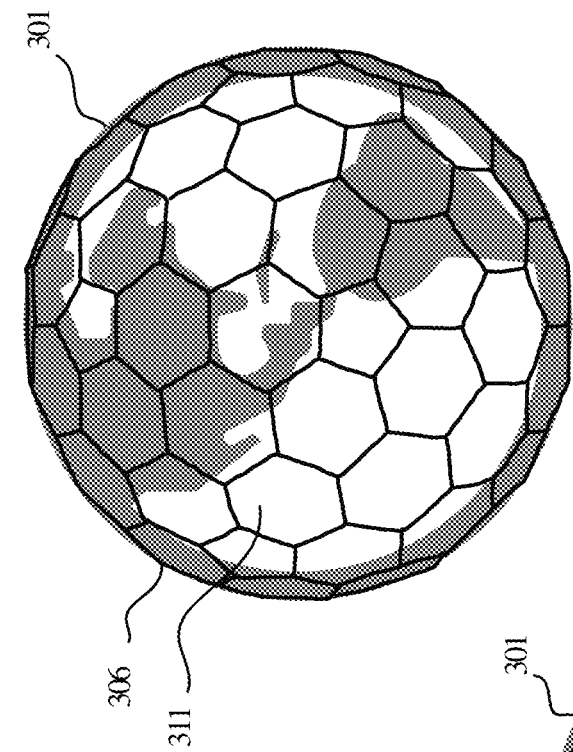
FIGS. 3A, 3B, and 3C illustrate examples of tessellated icosahedrons and Goldberg polyhedrons used to map cells and respective coordinates on Earth in accordance with some embodiments of the present technology.
Figure 3C:
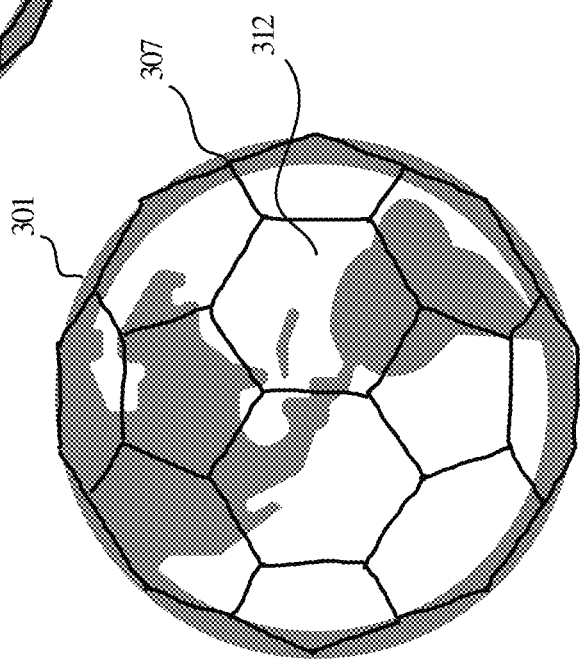
Figure 3A:
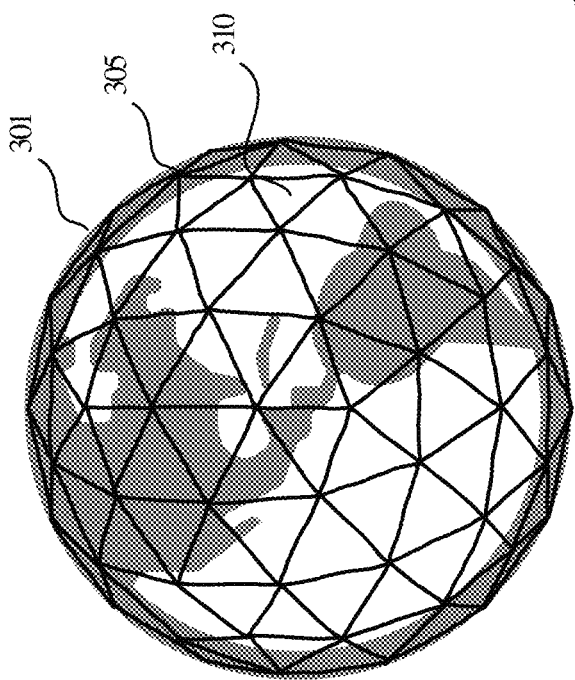

FIGS. 3A, 3B, and 3C illustrate examples of tessellated icosahedrons and Goldberg polyhedrons used to map hive-cells and respective coordinates on Earth in accordance with some embodiments of the present technology. FIG. 3A exemplifies a tessellation of an icosahedron covering the Earth, and it includes globe 301, icosahedron 305, and triangular hive-cell 310. FIG. 3B exemplifies a tessellation of a Goldberg polyhedron covering the Earth, which further includes globe 301, Goldberg polyhedron 306, and hexagonal hive-cell 311. FIG. 3C exemplifies another tessellation of a Goldberg polyhedron with fewer faces, and it includes globe 301, convex polyhedron 307, and hexagonal hive-cell 312.

In various embodiments, either a mapping tool or application, such as mapping apparatus 210 in FIG. 2, or a computing device, like computing device 220 in FIG. 2, creates a tessellation of an icosahedron to map Earth and cover all areas of globe 301 in equally sized cells. As shown in each of FIGS. 3A, 3B, and 3C, the cells, triangular hive-cell 310, hexagonal hive-cell 311, and hexagonal hive-cell 312, respectively, may take the form of various shapes and sizes based on an amount of tessellation. The amount of tessellation determines the amount of area covered by each of the cells, and it may be a pre-determined amount, or it may vary based on specifications required by SAR data or by one or more GPUs. Each cell of icosahedron 305, Goldberg polyhedron 306, and convex polyhedron 307 includes a range of coordinates associated with a location on globe 301. The coordinates can be associated with cells by either the mapping tool or the computing apparatus and stored in metadata of the mapping. Upon receiving radar data from a known location, the coordinates of the radar data can be determined and linked to one or more cells for processing.

First, in FIG. 3A, a tessellation of an icosahedron formed with many triangles is illustrated. A mapping apparatus initially covers globe 301 with a number of triangular hive-cells 310 to create icosahedron 305. In some embodiments, icosahedron 305 contains many triangles, while in other embodiments, it contains fewer triangles relative to other embodiments. To increase the level of tessellation, a mapping apparatus or computing device can split the triangles at their bisectors to increase the number of triangular hive-cells 310. The triangles can also be split by three or by some other factor.

Moving from FIG. 3A, the mapping apparatus or computing device can form hexagonal and pentagonal cells by combining a number of triangular hive-cells 310 to create Goldberg polyhedron 306, as shown in FIG. 3B. Using hexagonal hive-cells 311 provides a benefit when capturing radar data because the cells are phase contiguous, which means that processing data that overlaps from one of hexagonal hive-cell 311 to another, for example, is easier and more identifiable.

Next, FIG. 3C demonstrates a Goldberg polyhedron with fewer levels of tessellation, or fewer faces, meaning that each of hexagonal hive-cell 312 covers a greater amount of area. As mentioned, the amount of tessellation of the mapping may vary based at least on specifications required by SAR data or by one or more GPUs. In various embodiments, the level of tessellation is chosen based on what can be most efficiently processed on a single GPU. For example, if captured SAR data comprises high resolution data requiring high-processing capacity, the level of tessellation may increase so that the single GPU only processes one cell of data corresponding to a small area, such as 2 kilometers. In other embodiments, one cell of data can be processed among multiple GPUs depending on availability and efficiency.

Figures 4A, 4B:
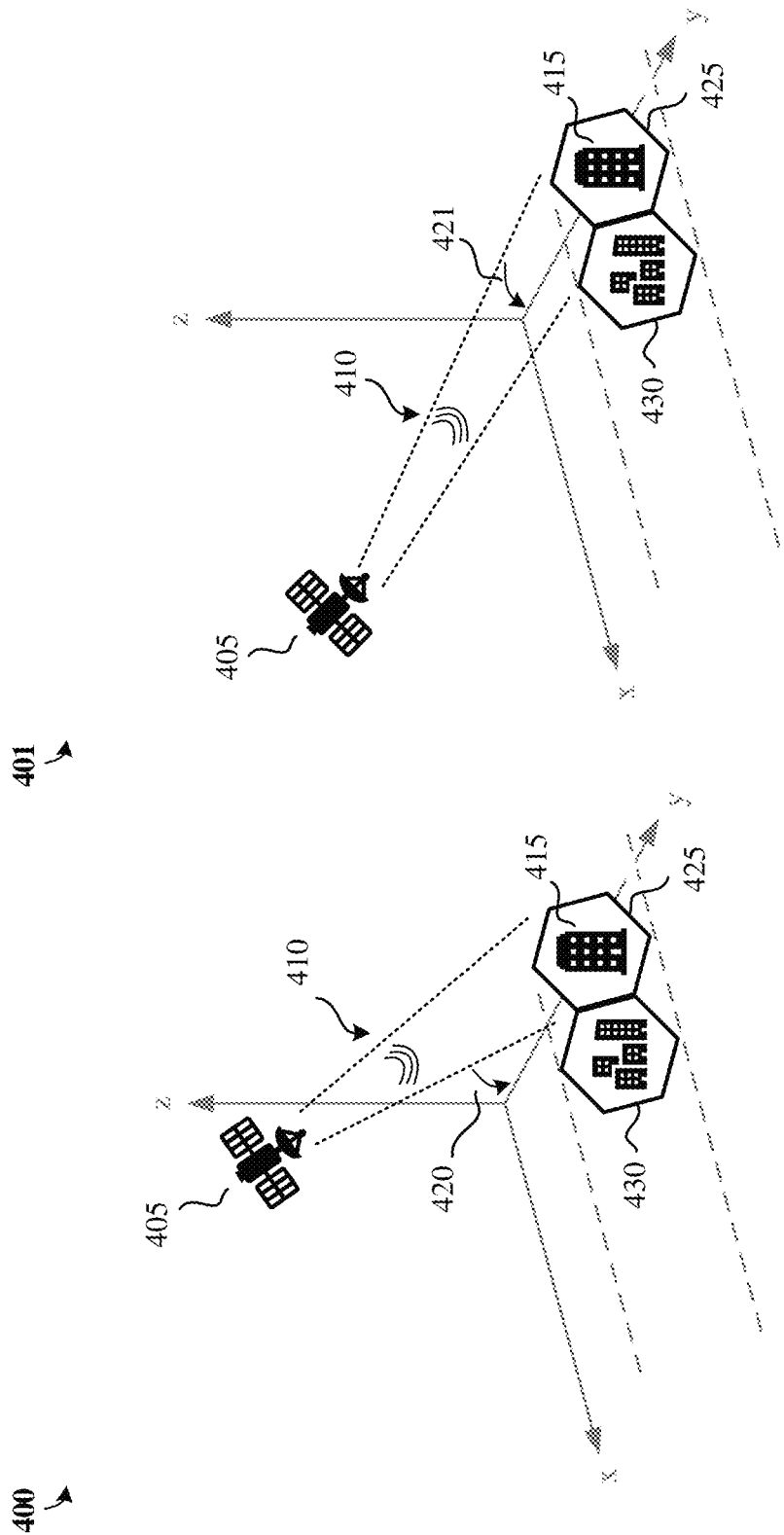
FIGS. 4A and 4B illustrate an example of capturing SAR data from different angles to perform various functions in accordance with some embodiments of the present technology.

FIGS. 4A and 4B illustrate examples of capturing SAR data from different angles in repeat passes to perform various functions in accordance with some embodiments of the present technology. FIG. 4A includes operational environment 400, which further includes SAR 405, RF transmission 410, imaging target 415, illumination angle 420, target cell 425, and adjacent cell 430. Similarly, FIG. 4B includes operational environment 401, wherein the activity demonstrated in operational environment 401 takes place at some time after the activity in operational environment 400. On this repeat pass, SAR 405 conducts a further capture of radar data from a different illumination angle 421.

In FIG. 4A, SAR 405 captures synthetic aperture radar data by emitting RF transmission 410 at imaging target 415 and receiving echoes from RF transmission 410. In various embodiments, a computing device or mapping apparatus plots a tessellation of a Goldberg polyhedron around the globe and correlates the cells of the Goldberg polyhedron with coordinates on Earth. For example, imaging target 415 and its coordinates are associated with target cell 425 of the Goldberg polyhedron. Other landscapes, such as a set of buildings, nearby imaging target 415 are associated with an adjacent cell 430.

In operational environment 400, SAR 405 operates at some distance and illumination angle 420 from imaging target 415. Because radar data is complex, having both a magnitude and phase, determining illumination angle 420 helps orthorectify the radar data. Further, projecting illumination angle 420 into the radar data allows for performing change detection in imaging target 415 on further passes by examining phase shifts in the radar data. Information such as illumination angle 420, distance from imaging target 415, location of imaging target 415 (corresponding to Goldberg polyhedron cells and coordinates), and the like can be stored in metadata of the radar data.

Next, as illustrated in FIG. 4B, SAR 405 passes by imaging target 415 again and captures radar data of the same area from a different illumination angle 421. As such, the metadata from this iteration would necessarily reflect the change in location and angle of SAR 405, along with any other changes, perhaps in imaging target 415 itself, captured in the radar data. Following this repeat pass by SAR 405, a computing device can compile the radar data from each iteration, align it with both the Goldberg polyhedron mapping and a topographical mapping of Earth, or a digital elevation model, to be processed (e.g. interferometrically) by one or more GPUs. As a use-case example, a GPU can process both sets of radar data, or portions of the radar data corresponding to a specific cell like target cell 425, to perform coherent change detection among other functions. By comparing at least the phase of the radar data in the first pass to the phase of the radar data in the second pass, the GPU can determine whether the landscape in target cell 425 has changed, or whether the discrepancy in phases resulted from a change in the illumination angle of SAR 405.

Figure 5:
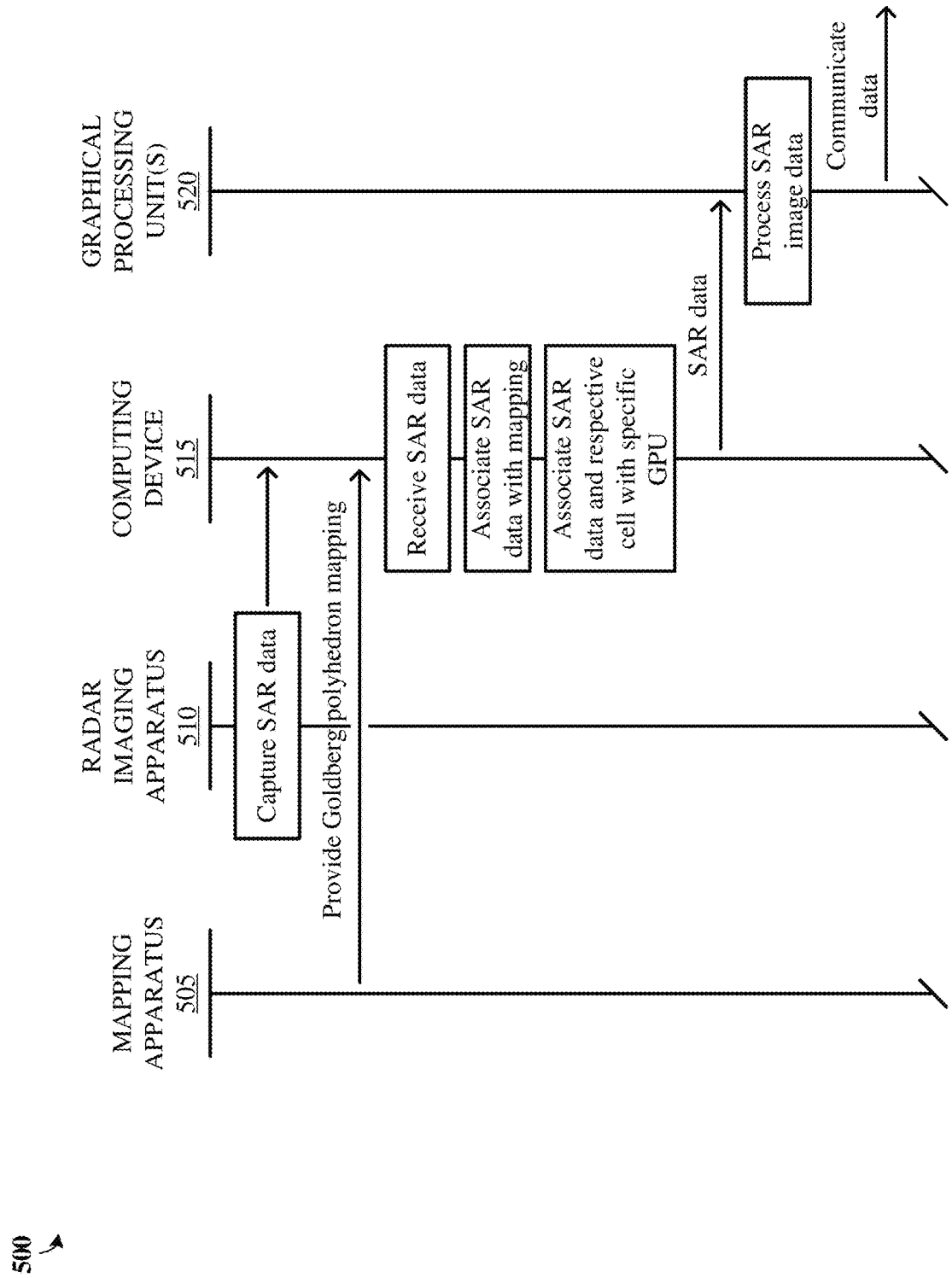
FIG. 5 illustrates a sequence diagram of data flow between various components of a radar-based imaging system in accordance with some embodiments of the present technology.

FIG. 5 illustrates a sequence diagram of data flow between various components of a radar-based imaging system in accordance with some embodiments of the present technology. FIG. 5 illustrates environment 500, which further includes mapping apparatus 505, radar imaging apparatus 510, computing device 515, and graphical processing units 520.

As illustrated in FIG. 5, the set of operations begins with capturing radar data and mapping the data to coordinates, then streamlining the processing to one or more GPUs for an efficient rendering of images from the radar data. First, the mapping apparatus 505 creates a tessellation of a Goldberg polyhedron to cover all areas on a globe in equally sized cells. The mapping can comprise many hexagonal and pentagonal cells, or it can comprise other shapes. By using a hive-cell mapping such as the Goldberg polyhedron, complex data including an amplitude and phase can be associated with a specific cell that is phase contiguous. After creating or obtaining the Goldberg polyhedron map, mapping apparatus 505 provides it to computing device 515.

Next, radar imaging apparatus 510 captures synthetic aperture radar (SAR) data using SAR equipment. In various embodiments, radar imaging apparatus 510 comprises one or more satellites equipped with SAR. In other embodiments, SAR technology can be used on various other vehicles, devices, and/or equipment to capture radar data. Then, computing device 515 receives the SAR data from radar imaging apparatus 510 over a communication link. Radar imaging apparatus 510 may downlink SAR data to a database accessible by computing device 515, or it may transmit SAR data directly to computing device 515.

Using both the Goldberg polyhedron mapping provided by mapping apparatus 505 and the SAR data, computing device 515 associates at least a portion of the SAR data with one or more cells on the mapping based on a location of the targeted area. The location can be attainable from metadata in the SAR data, from known coordinates of the target area, or the like. In addition to associating SAR data with the polyhedron mapping, computing device 515 may also align both with a digital elevation model which comprises a topographical mapping of Earth. Once the SAR data is correlated to respective cell(s) and the digital elevation model, computing device 515 associates the one or more cells with SAR data to one or more specific GPU(s) 520. The association process comprises comparing the size, density, resolution, and similar properties of the SAR data to the capacity, load, and size of the GPU. The computing device 515 matches a processing job to render SAR data based on what can be most efficiently processed on the GPU of GPUs 520. In some implementations, computing device 515 maps each cell of the Goldberg polyhedron that has SAR data to individual GPUs of GPUs 520. In other implementations, computing device 515 can map more than one cell to one GPU, or alternatively, it can map one cell to more than one GPU.

Each GPU of GPUs 520 processes the SAR data captured by radar imaging apparatus 510 against a synthetic scene of both the Goldberg polyhedron and the digital elevation model to construct two-dimensional or three-dimensional images. GPU 520 may then send the one or more images formed back to computing device 515, or it may send the images downstream for use elsewhere.

Figure 6:
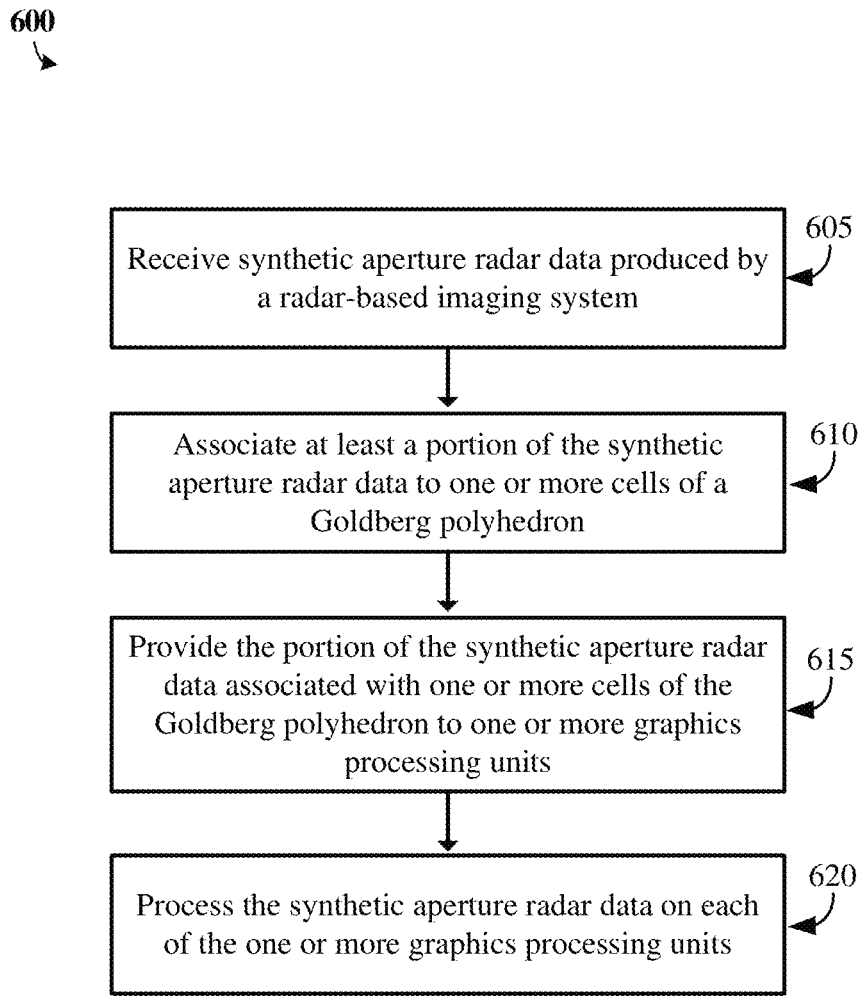
FIG. 6 is a flowchart illustrating a set of operations for SAR data processing in accordance with some embodiments of the present technology.

FIG. 6 is a flowchart illustrating a set of operations for SAR data processing in accordance with some embodiments of the present technology. In the set of operations illustrated in FIG. 6, a radar-based imaging system captures radar data which is then mapped to one or more GPUs based on various properties for efficient processing of radar images. FIG. 6 includes environment 600, where environment 600 further includes data retrieval step 605, association step 610, organization step 615, and processing step 620.

Beginning with data retrieval step 605, a radar-based imaging system comprising a synthetic aperture radar (SAR) transmits a signal over an imaging target to receive feedback and produce SAR data. A computing apparatus then receives the SAR data produced by the radar-based imaging system. At association step 610, the computing apparatus identifies a location or coordinates of the SAR data in order to correlate the data with a respective cell of a Goldberg polyhedron, wherein the Goldberg polyhedron comprises a tessellation that creates approximately equally sized hexagonal and pentagonal cells covering the globe. The computing apparatus associates at least a portion of the SAR data to one or more cells of the Goldberg polyhedron based on the location or coordinates of the portion of data.

Next, in organization step 615 the computing apparatus provides the portion of the SAR data associated with one or more cells of the Goldberg polyhedron to one or more GPUs. By organizing the SAR data into cells, the computing apparatus can determine a specific size and resolution of the SAR data to map. And consequently, by understanding a specific size and resolution of the SAR data, the computing apparatus can assign a cell to a GPU or an individual thread on said GPU to maximize efficiency of the processing job. Finally, the SAR data is processed on each of the one or more GPUs or threads on a GPU to construct two-dimensional or three-dimensional images.

Figure 7:
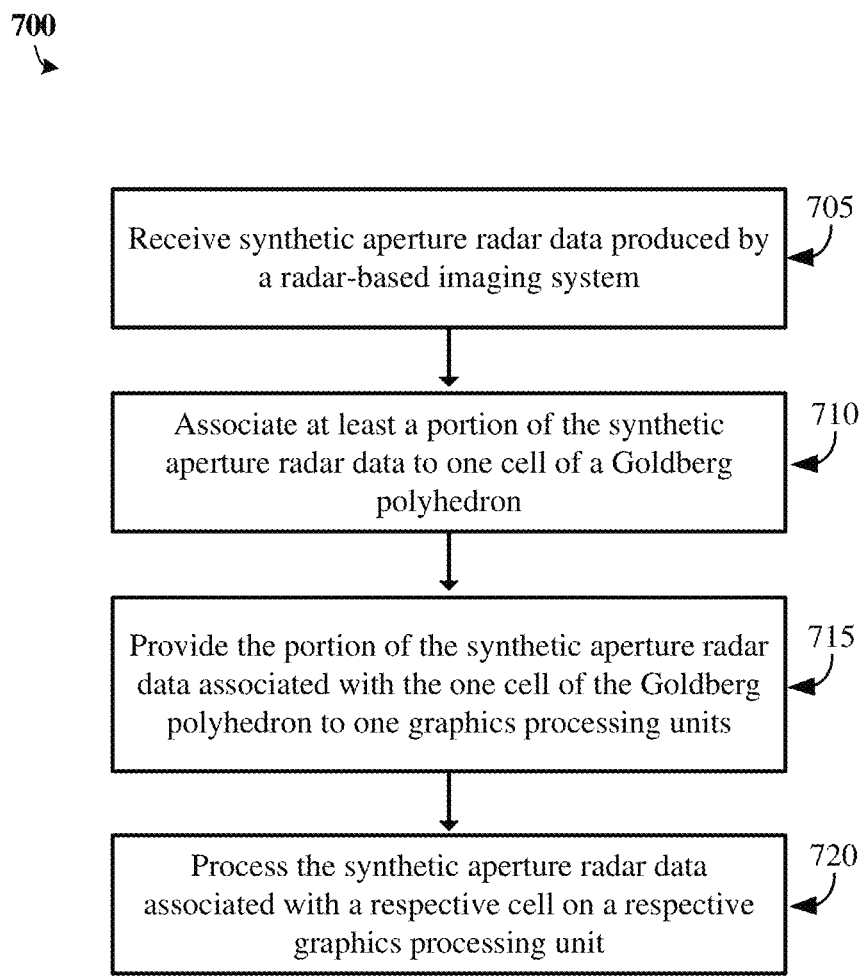
FIG. 7 is a flowchart illustrating a set of operations for SAR data processing in accordance with some embodiments of the present technology.

FIG. 7 is also a flowchart illustrating a set of operations for SAR data processing in accordance with some embodiments of the present technology. In the set of operations illustrated in FIG. 7, only SAR data corresponding to one cell of a Goldberg polyhedron map is assigned to a GPU for processing. FIG. 7 includes environment 700, where environment 700 further includes data retrieval step 705, association step 710, organization step 715, and processing step 720.

First, at retrieval step 705, a computing apparatus receives SAR data produced by a radar-based imaging system. This system can include satellites equipped with SAR technology or any other SAR-equipped device. As an example, a satellite can capture radar data and transmit it to a database, radar station, or other storage media accessible by the computing apparatus. At association step 710, the computing apparatus selects at least a portion of the SAR data and associates the data to one cell of a Goldberg polyhedron. The SAR data and its respective cell exemplify an imaging target illuminated by the radar-based imaging system and its corresponding location on Earth.

At the next step, organization step 715, the computing apparatus provides the portion of the SAR data associated with the one cell of the Goldberg polyhedron to one GPU or, perhaps, one thread on a GPU. At processing step 720, the computing apparatus can instruct the GPU to process the SAR data associated with its respective cell on the respective GPU thread to form one or more images from the SAR data.

Figure 8:
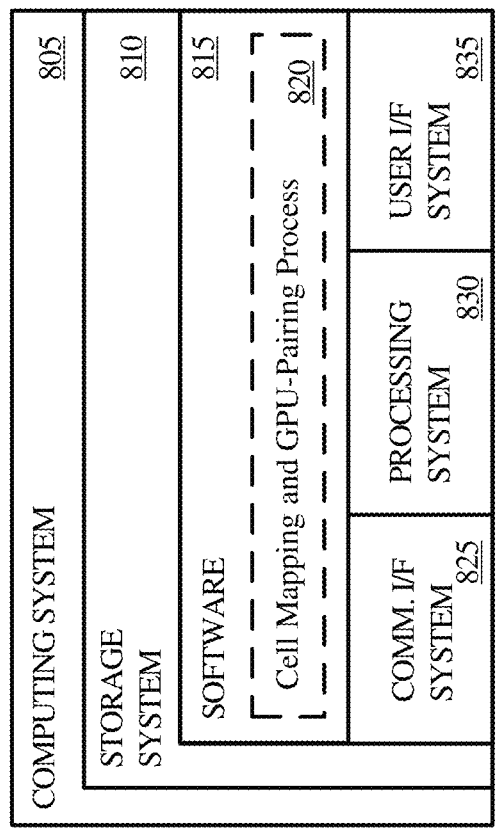
FIG. 8 illustrates an example of a computing system in accordance with some embodiments of the present technology.

FIG. 8 illustrates computing system 805 that is representative of any system or collection of systems in which the various processes, programs, services, and scenarios disclosed herein may be implemented. This computing system may be implemented in computing device 135 of FIG. 1 to collect, correlate, process, and render radar data for image formation. Examples of computing system 805 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 805 may be implemented as a single apparatus, system, or device or may be implemented in a distributed manner as multiple apparatuses, systems, or devices. Computing system 805 includes, but is not limited to, storage system 810, processing system 830, software 815, communication interface system 825, and user interface system 835. Processing system 830 is operatively coupled with storage system 810, communication interface system 825, and user interface system 835.

Processing system 830 loads and executes software 815 from storage system 810. Software 815 includes and implements cell mapping and GPU pairing process 820, which is representative of the SAR radar data and image formation and reconstruction processes discussed with respect to the preceding Figures. When executed by processing system 830 to provide image retrieval and image formation processes, software 815 directs processing system 830 to operate as described herein for at least the various processes, operational scenarios, and sequences discussed in the foregoing implementations. Computing system 805 may optionally include additional devices, features, or functionality not discussed for purposes of brevity.

Referring still to FIG. 8, processing system 830 may include a micro-processor and other circuitry that retrieves and executes software 815 from storage system 810. Processing system 830 may be implemented within a single processing device but may also be distributed across multiple processing devices or sub-systems that cooperate in executing program instructions. Examples of processing system 830 include general purpose central processing units, graphical processing units, application specific processors, and logic devices, as well as any other type of processing device, combinations, or variations thereof.

Storage system 810 may include any computer readable storage media readable by processing system 830 and capable of storing software 815. Storage system 810 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 810 may also include computer readable communication media over which at least some of software 815 may be communicated internally or externally. Storage system 810 may be implemented as a single storage device but may also be implemented across multiple storage devices or sub-systems co-located or distributed relative to each other. Storage system 810 may incorporate additional elements, such as a controller, capable of communicating with processing system 830 or possibly other systems.

Software 815 (including cell mapping and GPU pairing process 820) may be implemented in program instructions and among other functions may, when executed by processing system 830, direct processing system 830 to operate as described with respect to the various operational scenarios, sequences, and processes illustrated herein. For example, software 815 may include program instructions for implementing image retrieval and reconstruction process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 815 may include additional processes, programs, or components, such as operating system software, virtualization software, or other application software. Software 815 may also include firmware or some other form of machine-readable processing instructions executable by processing system 830.

In general, software 815 may, when loaded into processing system 830 and executed, transform a suitable apparatus, system, or device (of which computing system 805 is representative) overall from a general-purpose computing system into a special-purpose computing system customized to provide image retrieval and reconstruction processes as described herein. Indeed, encoding software 815 on storage system 810 may transform the physical structure of storage system 810. The specific transformation of the physical structure may depend on various factors in different implementations of this description. Examples of such factors may include, but are not limited to, the technology used to implement the storage media of storage system 810 and whether the computer-storage media are characterized as primary or secondary storage, as well as other factors.

For example, if the computer readable storage media are implemented as semiconductor-based memory, software 815 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 825 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 805 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of processing radar-based data, the method comprising:
   receiving synthetic aperture radar data produced by a radar-based imaging system;
   associating at least a portion of the synthetic aperture radar data to one or more cells of a Goldberg polyhedron;
   providing the portion of the synthetic aperture radar data associated with one or more cells of the Goldberg polyhedron to one or more graphics processing units; and
   processing the synthetic aperture radar data on each of the one or more graphics processing units, wherein processing the synthetic aperture radar data comprises:
      aligning the Goldberg polyhedron with a digital elevation model including a topographical reconstruction of Earth; and
      registering the synthetic aperture radar data to an alignment of the digital elevation model and the Goldberg polyhedron.

2. The method of claim 1, wherein the radar-based imaging system comprises one or more satellites equipped with a synthetic aperture radar.

3. The method of claim 1, wherein associating at least a portion of the synthetic aperture radar data to one or more cells of a Goldberg polyhedron further comprises:
   assigning coordinates to the one or more cells of the Goldberg polyhedron; and
   determining one or more coordinates associated with the portion of the synthetic aperture radar data.

4. The method of claim 1, wherein providing the portion of the synthetic aperture radar data associated with one or more cells of the Goldberg polyhedron to the one or more graphics processing units further comprises:
   selecting the one or more graphics processing units based at least on a resolution of the portion of the synthetic aperture radar data.

5. The method of claim 1, wherein providing the portion of the synthetic aperture radar data associated with one or more cells of the Goldberg polyhedron to the one or more graphics processing units further comprises:
   selecting the one or more graphics processing units based at least on a processing capacity of the one or more graphics processing units.

6. The method of claim 1, wherein processing the synthetic aperture radar data on each of the one or more graphics processing units comprises forming at least one among a two-dimensional image and a three-dimensional image.

7. The method of claim 5, wherein providing the portion of the synthetic aperture radar data associated with the one or more cells of the Goldberg polyhedron comprises:
   selecting the one or more graphics processing units based at least on properties of the portion of the synthetic aperture radar data associated with the one or more cells, wherein the properties include one or more of a size, a density, and a resolution.

8. A method of processing radar-based data, the method comprising:
   receiving synthetic aperture radar data produced by a radar-based imaging system;
   associating at least a portion of the synthetic aperture radar data to one cell of a Goldberg polyhedron;
   providing the portion of the synthetic aperture radar data associated with the one cell of the Goldberg polyhedron to one graphics processing unit; and
   processing the portion of the synthetic aperture radar data associated with a respective cell on a respective graphics processing unit, wherein processing the portion of the synthetic aperture radar data comprises:
      aligning the Goldberg polyhedron with a digital elevation model including a topographical reconstruction of Earth; and
      registering the synthetic aperture radar data to an alignment of the digital elevation model and the Goldberg polyhedron.

9. The method of claim 8, wherein the radar-based imaging system comprises one or more satellites equipped with a synthetic aperture radar.

10. The method of claim 8, wherein associating at least a portion of the synthetic aperture radar data to one cell of a Goldberg polyhedron further comprises:
    assigning coordinates to the one cell of the Goldberg polyhedron; and
    determining coordinates associated with the portion of the synthetic aperture radar data.

11. The method of claim 8, wherein providing the portion of the synthetic aperture radar data associated with the one cell of the Goldberg polyhedron to the one graphics processing unit further comprises:
   selecting the one graphics processing unit based at least on a resolution of the portion of the synthetic aperture radar data.

12. The method of claim 8, wherein providing the portion of the synthetic aperture radar data associated with the one cell of the Goldberg polyhedron to the one graphics processing unit further comprises:
   selecting the one graphics processing unit based at least on a memory capacity of the one graphics processing unit.

13. The method of claim 8, wherein processing the portion of the synthetic aperture radar data associated with the respective cell on the respective graphics processing unit comprises forming at least one among a two-dimensional image and a three-dimensional image.

14. The method of claim 12, wherein providing the portion of the synthetic aperture radar data associated with the one or more cells of the Goldberg polyhedron comprises:
   selecting the one or more graphics processing units based at least on properties of the portion of the synthetic aperture radar data associated with the one or more cells, wherein the properties include one or more of a size, a density, and a resolution.

15. A computing apparatus, comprising:
   one or more computer-readable storage media;
   a processing system operatively coupled with the one or more computer-readable storage media; and
   program instructions stored on the one or more computer-readable storage media that, based on being read and executed by the processing system, direct the computing apparatus to at least:
   receive synthetic aperture radar data produced by a radar-based imaging system;
   associate at least a portion of the synthetic aperture radar data to one or more cells of a Goldberg polyhedron;
   provide the portion of the synthetic aperture radar data associated with the one or more cells of the Goldberg polyhedron to one or more graphics processing units; and
   process the synthetic aperture radar data on each of the one or more graphics processing units, wherein processing the synthetic aperture radar data comprises:
   aligning the Goldberg polyhedron with a digital elevation model including a topographical reconstruction of Earth; and
   registering the synthetic aperture radar data to an alignment of the digital elevation model and the Goldberg polyhedron.

16. The computing apparatus of claim 15, wherein the radar-based imaging system comprises one or more satellites equipped with a synthetic aperture radar.

17. The computing apparatus of claim 15, wherein to associate at least a portion of the synthetic aperture radar data to one or more cells of a Goldberg polyhedron, the program instructions further direct the computing apparatus to:
   assign coordinates to the one or more cells of the Goldberg polyhedron; and
   determine one or more coordinates associated with the portion of the synthetic aperture radar data.

18. The computing apparatus of claim 15, wherein to provide the portion of the synthetic aperture radar data associated with one or more cells of the Goldberg polyhedron to the one or more graphics processing units, the program instructions further direct the computing apparatus to:
   select the one or more graphics processing units based at least on a resolution of the portion of the synthetic aperture radar data.

19. The computing apparatus of claim 15, wherein to provide the portion of the synthetic aperture radar data associated with one or more cells of the Goldberg polyhedron to the one or more graphics processing units, the program instructions further direct the computing apparatus to:
   select the one or more graphics processing units based at least on a memory capacity of the one or more graphics processing units.

20. The computing apparatus of claim 15, wherein to process the synthetic aperture radar data on each of the one or more graphics processing units, the program instructions further direct the computing apparatus to:
   form at least one among a two-dimensional image and a three-dimensional image.

* * * * *